April 6, 1954  F. F. RAVLIN  2,674,395
MEANS FOR LOADING TRANSPARENT GUN BALL MACHINES
Filed Jan. 24, 1950

INVENTOR
Frederick F. Ravlin
BY Donald Imirie
ATTORNEY

Patented Apr. 6, 1954

2,674,395

UNITED STATES PATENT OFFICE 2,674,395

MEANS FOR LOADING TRANSPARENT GUM BALL MACHINES

Frederick F. Ravlin, Coral Gables, Fla.

Application January 24, 1950, Serial No. 140,328

8 Claims. (Cl. 226—29)

This invention relates to new and useful improvements in coin operated gum ball machines and the primary object of the present invention is to provide an apparatus for filling the transparent peripheral wall of a gum ball machine so that a larger concentration of gum balls and trinkets will be present at the sides of the peripheral wall than at the central portion of the peripheral wall.

Another very important object of the present invention is to provide a device for filling gum ball machines with gum balls and trinkets so constructed as to obviate the heretofore unsanitary and unsatisfactory method of hand loading the machines.

Yet another important object of the present invention is the provision of a filling sleeve having a means for receiving the usual cover hold down bolts of a gum ball machine in order to center and retain the sleeve coaxial with the transparent peripheral wall of the gum ball machine.

A further object of the invention is to provide a device of the aforementioned character that is quickly and readily applied to or removed from a gum ball machine in a convenient manner without in any way harmfully affecting the normal structure of the machine.

A still further aim of the present invention is to provide a device for loading a gum ball machine that is simple and practical in construction, strong and reliable in use, small and compact in structure, efficient and durable in operation, relatively inexpensive to manufacture, and otherwise well adapted for the purpose for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
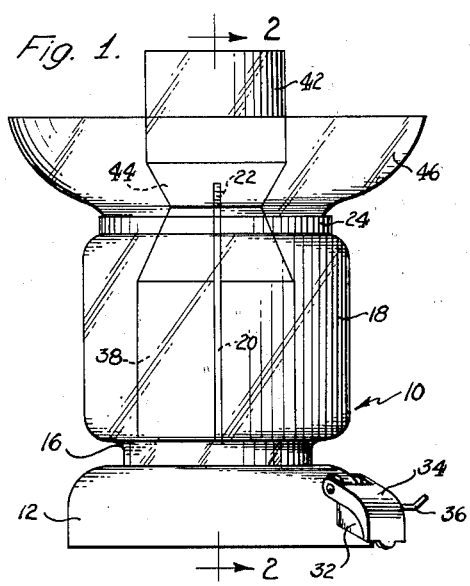
Figure 1 is a side elevational view of a gum ball machine, the cover removed therefrom and showing the present invention applied to the machine.
Figure 2:
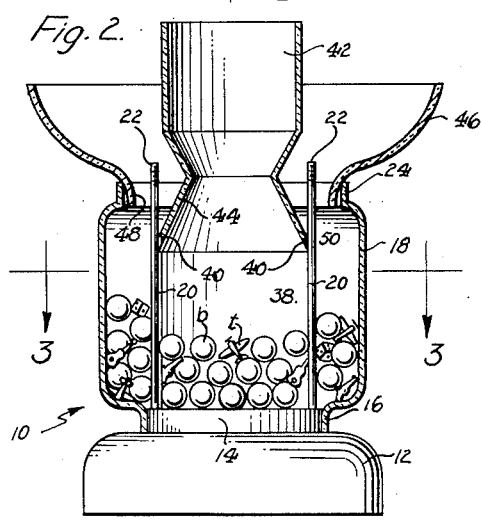
Figure 2 is a longitudinal vertical sectional view taken substantially on the plane of section line 2—2 of Figure 1 and showing the machine partly filled with gum balls and trinkets.
Figure 3:
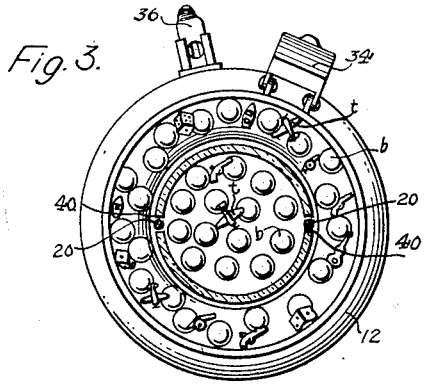
Figure 3 is a transverse horizontal sectional view taken substantially on the plane of section line 3—3 of Figure 2; and, Figure 4 is a group perspective view of a gum ball machine and the parts forming the present invention.
Figure 4:
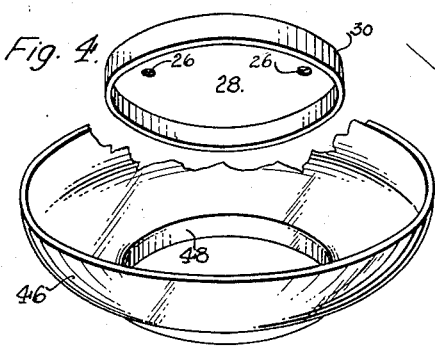
Figure 4:
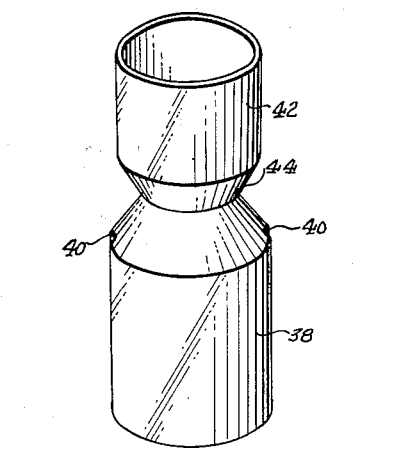
Figure 4:
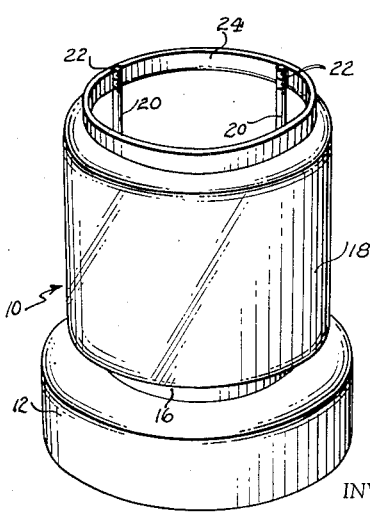

Referring now to the drawings in detail, wherein for the purpose of illustration, there is disclosed a preferred embodiment of the present invention, the numeral 10 represents a coin operated gum ball machine generally, including a base 12 having an upstanding reduced upper portion 14.

The reduced lower end portion 16 of a transparent peripheral wall or sleeve-like wall 18 is fitted about the upper portion 14 of the base 12 and the wall 18 rises from the base 12 as shown in the drawings to form a receptacle.

A pair of spaced parallel cover holding posts or hold down bolts 20 rise from the base. The sleeve-like wall 18 is spaced from and surrounds the bolts 20 and the upper threaded ends 22 of the bolts 20 extend well above the upper reduced end portion 24 of the wall 18 to enter a pair of diametrically opposed openings 26 provided in a cover or closure 28. The cover 28 includes a depending flanged portion or skirt 30 for surrounding the upper reduced end portion 24 of the wall 18 when the cover 28 is applied to the machine and the cover is retained on the wall 18 by suitable nuts (not shown) that are threaded on the upper ends of the bolts.

The machine 10 also includes a delivery chute 32 having a hinged closure 34 that is manually raised to permit articles passing from the machine and entering the chute to be conveniently removed from the chute.

A coin receiving mechanism 36 forms part of the machine 10 so that when a coin is fed into the machine a predetermined number of articles in the machine will pass into the chute 32.

The present invention does not attempt to claim the above well known and conventional coin operated gum ball machine but is merely a device to be used in conjunction therewith whereby the wall 18 may be filled with gum balls B and trinkets T so that a greater concentration of gum balls and trinkets will be present closer to the sides of the wall 18 than at the center of the wall 18.

To accomplish the above desired result, there is provided an elongated tubular member or funnel 38 that is inserted into the wall 18 to be supported in an upright position on the base 12. A pair of longitudinally extending diametrically opposed channels or slots 40 are provided in the lower portion and outer periphery of the funnel 38 and receive the bolts 20 to retain the funnel 38 centered within the wall 18 and concentric of the wall 18.

The upper end portion 42 of the funnel 38 extends well above the upper end of the wall 18 and the funnel 18 is provided with a reduced or restricted central portion 44 that is located at the upper end of the wall 18 for a purpose later to be more fully described.

A trough or spout 46 embraces the upper portion of the funnel 38 and includes a reduced delivery neck or lower portion 48 that enters the upper end of the wall 18. The spout 48 is supported solely by the wall 18 and a filling space 50 is provided between the neck 48 and the central portion 44 of the funnel 38.

In practical use of the present invention, the cover 28 is first removed from the wall 18 and the bolts 20. Then the funnel 38 is slipped into the wall 18 with the bolts 20 entering the channels 40. The spout or outer funnel 46 is then placed about the upper portion of the funnel 38 with the portion 48 entering the upper portion of the wall 18.

Gum balls and a few trinkets are fed into the funnel 38 and gum balls and trinkets are fed into the spout 46. In order to display the type of trinkets and to increase the number of trinkets visible through the wall 18, the ratio of trinkets per gum balls placed in the spout 46 is higher than the ratio of trinkets per gum balls placed in the funnel 38.

After the machine has been properly filled with gum balls and trinkets, the spout 46 and the funnel 38 are removed and the cover 28 again applied to the wall 18 and the bolts 20.

The space 50 is sufficient to prevent the articles passing into the wall 18 from clogging.

It is preferred that the funnel 38 and the spout 46 be constructed of transparent material, such as plastic, so that the quantity of articles inserted therein can be easily viewed to prevent overfilling of the machine with gum balls and trinkets.

What I claim is:

1. In a gum ball machine including a base, a transparent peripheral sleeve like wall rising from the base and a pair of cover holding posts rising from the base and located within the wall, a device for filling the space within the sleeve like wall comprising a tubular member received within said wall and retained concentrically of said wall by said posts, and a filling spout surrounding the tubular member and having a lower reduced portion entering the upper end of the wall.

2. The combination of claim 1 wherein said tubular member includes a pair of longitudinally extending channels in its outer periphery receiving said posts to retain the tubular member centered within the sleeve.

3. In a coin operated gum ball machine including a base, a transparent sleeve-like wall supported on and rising from the base, and a pair of spaced parallel cover holding bolts rising from the base, said sleeve-like wall surrounding the bolts and being spaced from the bolts, means for loading the space within the sleeve-like wall comprising an elongated tubular member having a lower portion received within the sleeve-like wall and resting on the base, the outer periphery of said tubular member having a pair of longitudinally extending diametrically opposed channels therein receiving said holding bolts to center the tubular member within the sleeve-like wall.

4. The combination of claim 3 wherein said tubular member includes a reduced central portion located at the upper end of said sleeve-like wall to provide a filling opening between the reduced central portion of said tubular member and the upper end of said sleeve-like wall.

5. The combination of claim 3 and a funnel member surrounding the upper portion of said tubular member and including a reduced lower portion supported solely by said sleeve-like wall.

6. In combination with a coin operated gum ball machine having a base and a transparent sleeve like wall supported on and rising from the base and a pair of upstanding cover holding bolts located within the sleeve like wall, a means for filling the machine with gum balls and trinkets so that a larger number of gum balls per trinket can be placed at the center of the sleeve like wall than at the side of the sleeve like wall, said means comprising a tubular funnel received within the space surrounded by the sleeve like wall and having a cross sectional area considerably less than the cross sectional area of said sleeve like wall, said funnel including an upper portion extending well above the upper end of said sleeve like wall, and a filling trough surrounding the upper portion of said funnel and including a dispensing nipple entering the peripheral wall and disposed concentrically of said funnel, said trough being supported solely by said peripheral wall, said funnel having a pair of vertical recesses in its outer periphery receiving the bolts to center the funnel within the sleeve like wall.

7. The structure recited in claim 6 wherein said funnel includes a reduced central portion located at the upper end of said sleeve like wall and spaced radially inwardly from the upper end of said sleeve like wall to provide a filling space between the upper end of said peripheral wall and the central portion of said funnel.

8. In a coin operated gum ball machine including an upstanding sleeve like wall and a pair of cover holding bolts spaced from and surrounded by the wall; means for loading the space surrounded by the wall comprising an elongated tubular member positioned in the space within the wall and centered with the wall by the bolts, and a funnel member having a lower discharge nipple received in the upper end of said wall, said tubular member having a continuous recess formed in its outer periphery medially its ends and spaced radially inwardly from the discharge nipple to provide a relatively large filling space between the discharge nipple and the tubular member.

References Cited in the file of this patent
UNITED STATES PATENTS

| Number | Name | Date |
| --- | --- | --- |
| 332,904 | Hill | Dec. 22, 1885 |
| 483,049 | Fisher et al. | Sept. 20, 1892 |
| 797,751 | Roth | Aug. 22, 1905 |
| 1,527,934 | Stalder | Feb. 24, 1925 |
| 2,186,853 | Yost | Jan. 9, 1940 |